(12) United States Patent
Hoberman

(10) Patent No.: US 9,686,365 B2
(45) Date of Patent: Jun. 20, 2017

(54) SYSTEM AND METHOD FOR EVENT TRIGGERED INFORMATION DISTRIBUTION

(71) Applicant: Metropolitan Life Insurance Co., New York, NY (US)

(72) Inventor: Gary Hoberman, Muttontown, NY (US)

(73) Assignee: Metropolitan Life Insurance Co., New York, NY (US)

( * ) Notice: Subject to any disclaimer, the term of this patent is extended or adjusted under 35 U.S.C. 154(b) by 28 days.

(21) Appl. No.: 14/041,770

(22) Filed: Sep. 30, 2013

(65) Prior Publication Data

US 2014/0136619 A1    May 15, 2014

Related U.S. Application Data

(63) Continuation-in-part of application No. 13/969,323, filed on Aug. 16, 2013.

(60) Provisional application No. 61/726,289, filed on Nov. 14, 2012.

(51) Int. Cl.
| | |
|---|---|
| *G06F 15/16* | (2006.01) |
| *G06F 15/173* | (2006.01) |
| *H04L 29/08* | (2006.01) |
| *H04L 12/58* | (2006.01) |
| *H04L 12/18* | (2006.01) |

(52) U.S. Cl.
CPC .............. *H04L 67/18* (2013.01); *H04L 51/20* (2013.01); *H04L 67/327* (2013.01); *H04L 12/1895* (2013.01); *H04L 51/14* (2013.01)

(58) Field of Classification Search
CPC ........ H04L 67/18; H04L 51/20; H04L 67/327
USPC ................................ 709/204, 203, 224, 207
See application file for complete search history.

(56) References Cited

U.S. PATENT DOCUMENTS

| | | | |
|---|---|---|---|
| 2003/0009461 A1 | 1/2003 | Notargiacomo et al. | |
| 2005/0096095 A1 | 5/2005 | Benco et al. | |
| 2006/0029199 A1* | 2/2006 | Osterer et al. | 379/88.22 |
| 2007/0038483 A1* | 2/2007 | Wood | 705/4 |
| 2007/0136080 A1* | 6/2007 | Jones | 705/1 |

(Continued)

FOREIGN PATENT DOCUMENTS

| | | |
|---|---|---|
| CN | 1617610 A | 5/2005 |
| WO | 2011059308 A2 | 5/2011 |

OTHER PUBLICATIONS

International Search Report dated Mar. 28, 2014 to PCT/US13/70092.

(Continued)

*Primary Examiner* — Ario Etienne
*Assistant Examiner* — Sahera Halim
(74) *Attorney, Agent, or Firm* — Troutman Sanders

(57) ABSTRACT

System and computer-based method for automatically distributing information upon the occurrence of predefined events is provided. In a preferred embodiment, the system includes a tool that provides an intuitive interface that allows users to easily create content to be stored and delivered to a recipient upon the occurrence of a predefined event related to the location of the recipient. Location data may be retrieved from the recipient's mobile device, or social media websites. The system provides a valuable location-based information delivery system that allows for shared experience capability across time.

17 Claims, 12 Drawing Sheets

(56) References Cited

U.S. PATENT DOCUMENTS

| | | |
|---|---|---|
| 2012/0054589 A1 | 3/2012 | Berger et al. |
| 2012/0282887 A1 | 11/2012 | Khoo et al. |
| 2013/0046810 A1* | 2/2013 | Loew .......................... 709/203 |
| 2013/0060874 A1* | 3/2013 | Stephens ...................... 709/206 |
| 2013/0080532 A1* | 3/2013 | Stewart ........................ 709/204 |
| 2013/0325978 A1* | 12/2013 | Mansfield et al. ............ 709/206 |

OTHER PUBLICATIONS

Chinese First Office Action mailed Dec. 22, 2016 issued in corresponding Chinese Application No. 01380065065.8 (including English Translation).

* cited by examiner

SYSTEM AND METHOD FOR EVENT TRIGGERED INFORMATION DISTRIBUTION

CROSS REFERENCE TO RELATED APPLICATION

The present application is a Continuation-In-Part application of U.S. application Ser. No. 13/969,323, filed on Aug. 16, 2013 which in turn claims priority to U.S. Provisional Patent Application Ser. No. 61/726,789, filed on Nov. 14, 2012, and claims priority to that application. The contents of those applications are incorporated herein by reference.

BACKGROUND

Various estate planning vehicles, such as wills, allow individuals to pass along money, real estate, personal property, and other defined assets to family or friends after that individual's death. There is a lack of effective means, however, to automatically pass along person-to-person information upon the occurrence of a predefined event. For example, a father who wants to leave a collection of video messages for friends and family to watch after his death faces logistical challenges and considerable expense in recording, storing, centralizing and delivering this collection of posthumous messages on a predetermined timeline. Alternately, even if the individual's death does not occur by the time of a predetermined event, such as the child's sixteenth birthday or college graduation, the individual still faces uncertainty about his or her ability to participate in these life events. For example, an individual may face restricted access to their child following an unanticipated separation from his family or home country, a long-term relocation for business, or military deployment. In another example, mobility or financial restrictions may limit a person's ability to visit certain locations with family members, such as theme parks or cruises.

As social networking becomes an integral tool for communication across the globe, older techniques of recording significant life events stand to grow obsolete or be abandoned by the coming generations. What is lacking in the current social networking environment, however, is a future-oriented model of planned communication, and more specifically, a planned communication tool that is built to structure itself to a timeline of events.

Therefore, there is a need for an effective means of providing person-to-person information to select recipients upon the occurrence of certain events, such as a death, engagements, graduations, birthdays or other life event, at a specific time or date; and/or when the recipient is in a specific location.

DETAILED DESCRIPTION

Figure 1:
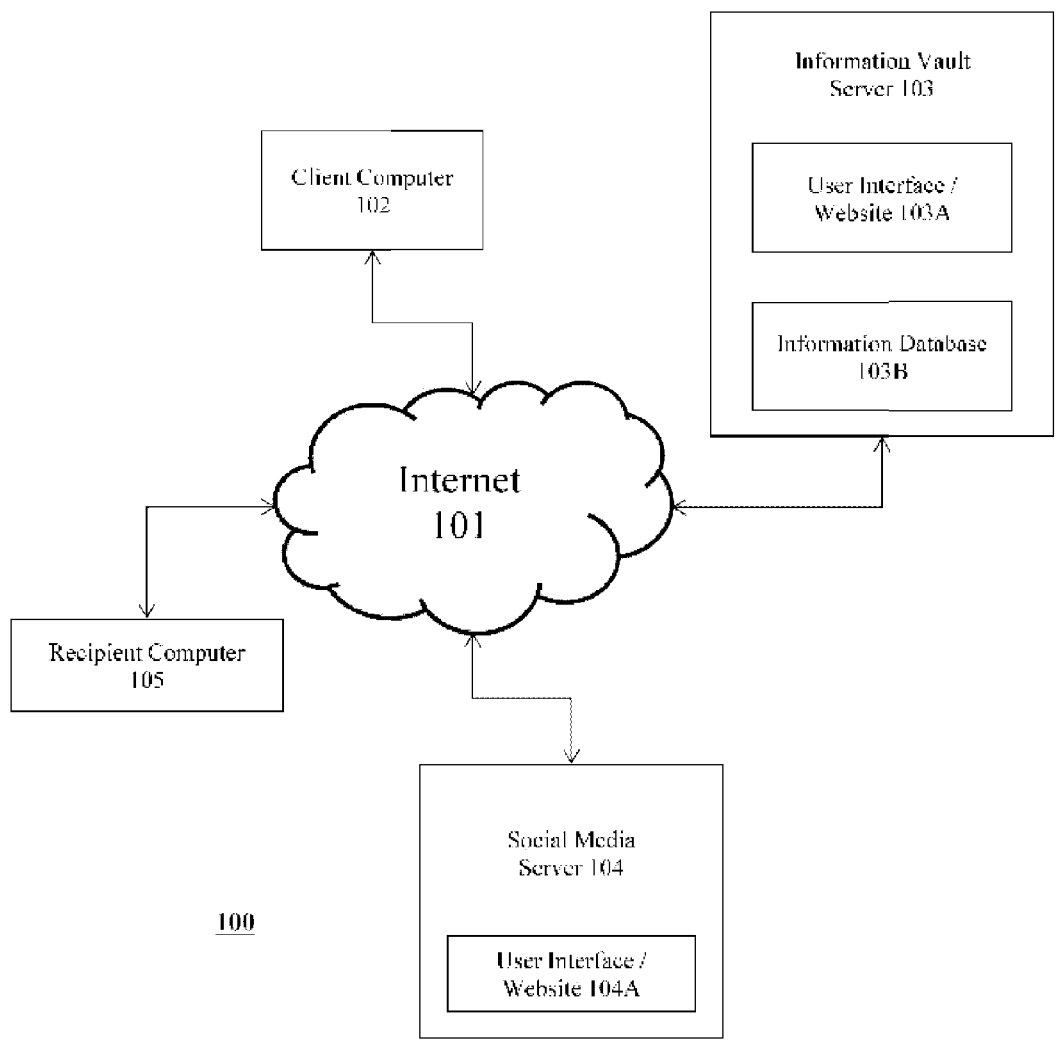
FIG. 1 illustrates the environment of the disclosed technology in accordance with one embodiment.

The present invention provides a data-processing system and computer-based method to effectively receive information from a user, store the received information, and distribute the received information to one or more designated recipients ("designees") upon the occurrence of an event. In a preferred embodiment, the system includes a software tool that provides an intuitive interface that allows users to easily create or upload content to be stored and delivered.

The "Information Vault" is a system that will store video, audio, text, and other digital information. The system also contains controlled programming for delivery of at least some of the information to one or more designees, upon the occurrence of an event. Triggering events can include life events such as an individual's death, engagements, graduations, birthdays, specific dates/times, promotions, new jobs/first jobs, marriages, senior proms, sweet sixteen's, college acceptances, births of grandchildren, etc.; may be set to a specific date/time; and/or may be dependent on a designee's location. In a preferred embodiment, delivery of this information occurs over a multi-node network, such as the Internet. In a preferred embodiment, the system will also include an effective information delivery system that leverages social networking.

The client may add other information describing the content ("metadata") stored on the Information Vault. This can occur when the client first uploads the content to or selects the content from the Information Vault, or after this occurs. The metadata may include any information describing the content such as describing when the content was created (e.g. time, date, occasion, age, etc.), the location where the content was created (e.g. geolocation, address, "home", "vacation", "work", etc.), what equipment was used to create the content (e.g. mobile device, digital camera/camcorder, webcam, etc.), and/or the relevance of the content (e.g. "baby's first steps", "wedding", "first job", "new home", "graduation", etc.). The system may be configured to allow for the metadata to be selected from a set of predefined descriptors ("tags") and/or entered in text fields. In a preferred embodiment, the system will require certain types of metadata to be created for all stored content.

The client may designate one or more mechanisms for the delivery of saved content to his or her designees and may update this information at any time. Delivery mechanisms may include electronic mail ("email"), social media websites (e.g. Facebook, Google+, MySpace, etc.), dedicated mobile or other computer software application, physical mail, or any other suitable form of delivering the stored content. In a preferred embodiment, the client designates multiple forms of delivery to compensate for the risk of any single delivery mechanism failing. For example, the client may be required to provide each designee's email address as well as physical mail address. The delivery of the saved content upon occurrence of the designated event may occur directly through the specified delivery mechanism or mechanisms, or may require the designee to install a dedicated software application on his or her mobile device or computer.

The system may be further configured to seek confirmation of the event occurrence from the client after the system initially detects the occurrence of an event as a precondition to the system initiating the delivery of the saved content to the designees. The mechanism for event confirmation may be set by the client and may include forms of communications such as email, social media websites (e.g. Facebook, Google+, MySpace. etc.), dedicated mobile or other computer software application, physical mail, telephone, or any other suitable form of communication with the client. The system may be further configured to allow the client to confirm or deny the event within a specified period of time. In the event that the client does not respond within the set time period, the system may seek further confirmation through the proxy confirmation process. The system may further allow for the client to set the time period that he or she has to reply before the system resorts to the proxy confirmation process.

In a preferred embodiment, the system account set-up includes the selection of one or more event confirmation proxies. A proxy is an individual who is tasked with confirmation of events associated with a particular client or designee in the event that the client is unable to do so. For example, if the system detects the death of the client, an event confirmation process is triggered to contact the listed proxy for that client and request confirmation that in fact the death has occurred. This feature is particularly useful for event triggers that are dependent on the responsiveness of the client (e.g. client's death or illness) where the client would be unable to respond to the initial client confirmation attempt. In one embodiment, the system requires the designation of one or more proxies if the client selects his or her own death and/or illness as the event trigger. The proxy feature is also useful to prevent improper/premature disclosures based on mistaken events. If the proxy confirms the designated event, this triggers the system release/disclosure processing steps in accordance with the stored programming. If the proxy fails to confirm, this leads to a series of additional checks on the data regarding the event. For example, system administrators are contacted to determine the proper course of action. The associated disclosures will not be triggered until a suitable confidence threshold is achieved utilizing the proxy contact portal. In one embodiment, the system advises against or restricts the client from designating a proxy that is also a designee.

In a preferred embodiment, more than one proxy is designated and each designated proxy is contacted to confirm the event occurrence. Multiple proxies provide a level of redundancy in the confirmation of the event in the scenario where a proxy is unreachable through the provided contact means, is unavailable (e.g. dead, ill, incarcerated, etc.), does not have access to the information necessary to confirm the event occurrence, or is otherwise not able or unwilling to provide confirmation. Designating more than one proxy also provides extra security against fraud or collusion by reducing the risk that a proxy will falsely confirm an event occurrence to trigger an improper release of information. In another embodiment, the client may set the confidence threshold necessary to confirm the event based on the number or proportion of proxy confirmations. For example, a client designates 10 proxies and defines the confidence threshold as requiring at least 3 proxies to confirm an event occurrence. In another example, the client designates 10 proxies and defines the confidence threshold as requiring at least a majority of the proxies (i.e. 6 or more) to confirm the event occurrence.

The user may define a location-based trigger to initiate the delivery of stored content to a designee. In a preferred embodiment, the user sets the location of the designee as the event trigger and the user's stored content is released when the designee's location satisfies the location trigger parameters set by the user. The location trigger parameters allow the user to refine the location-related conditions that the designee must satisfy in order to release the content. Location-trigger parameters must include at least a defined location (e.g. "lat. 40.751719, long. −73.97538," "Los Angeles, Calif.," "Disney World", "zip code 10017"), and may also include other parameters such as location threshold radius (e.g. "within 10 miles from the center of Paris"), duration of time at location, time/date of visit (e.g. "during Mardis Gras of 2014," "within three years"), life-event trigger (e.g. "during honeymoon"), etc. At least some of these parameters may be preset by the system administrator.

The designee's location may be determined from mobile device application, social media monitoring, and/or other sources of location data. In a preferred embodiment, the designee pre-installs a mobile application on his or her smart device (e.g. iPhone) and enables access to the device's location data (e.g. Location Services). In another embodiment, social media websites, such as FourSquare or Facebook, are monitored to determine if the designee "checks in" or is checked in by anyone else.

The user may configure the location-based event trigger to provide an indication or hints to the designee that location-based content is available to the designee. This feature allows the user to give the designee motivation to visit a location in order to receive the stored content. For example, a user sets a location-based trigger that delivers a digital gift card if the designee enters the city boundary of New York City and writes a clue that reads, "Treasure awaits you in the City That Never Sleeps." The clue is displayed on the designee's mobile application and if the designee visits New York City, receives the stored gift card.

The user may also configure more complex location-based trigger rules, such as multi-location, or super- and sub-location rules. In a multi-location scenario, the user defines a set of more than one locations, and may choose whether a visit to a specific number of locations within the set will release the stored content to the designee. For example, a father defines a location set that includes his ten favorite restaurants, and chooses to deliver a photo of him with his designee, his daughter, eating at a restaurant when she visits any one of them. In a super- and sub-location scenario, the user defines a broader super-location and one or more sub-locations within the super-location. The user may set clues and content delivery based on this hierarchy. For example, the user may set up clues to a super-location (e.g. "Disney World") and additional clues to sub-locations that appear once the designee enters the super-location (e.g."Splash Mountain, Pirates of the Caribbean, Cinderella Castle"). In this embodiment, a scavenger hunt is created where the designee collects locations rather than objects, allowing the user to share memorable experiences with his or her designee without requiring the user's presence.

The user may have the option to further configure his or her location-based trigger events to include a failsafe trigger in the event that the designee never reaches the designated location. The failsafe-trigger conditions may be based on a set time limit or a life event, such as a birthday, or the user's death. If the user sets up a failsafe trigger based on a life event, the system monitors for the occurrence of these life events as described above. The user's location-based content package may be set to be released to the designee when the failsafe-trigger conditions are met, but the location-trigger parameters have not been satisfied.

Data on life events and location history combined with related contact information may also provide valuable product marketing opportunities. As described above, the presently disclosed process and system provides a database of life events that have occurred or are predicted to occur during the course of an individual's lifetime and locations visited by the individual. Information on past life events can be derived from the associated metadata stored by the client. Future life events are described as event triggers by the client. An individual's location history may be determined from multiple sources of location data. For example, a user's location may be saved in the location metadata created when content is created as described above. In another example, a designee's location may be tracked in embodiments that use specific locations as a triggering event. Data on past and future life events, and location history can provide useful information on the individual's needs and interests at a particular time. Products meeting the needs and interests that these data generate can then be marketed to the individual at an opportune time, preferably at or near the occurrence of the life event. The contact information stored in the Information Database provides a direct channel of communication to the individual for delivery of information related to the products. In effect, having precise and reliable data on an individual's life events and location history provides an opportunity for needs- and interest-based market segmentation at an individual and near real-time level.

In one illustrative example, a client uploads photos of her recently purchased house and adds metadata describing the content as "New Home." The system interprets the life event described in the metadata and information related to the purchase of homeowner's insurance is delivered to the client. In another illustrative example, a client using the application names his daughter as a designee and selects the birth of her first baby as the life event that will trigger the delivery of stored content to her. When the daughter's first baby is born, the event status is updated in the Information Database and information related to the creation of a college savings plan (e.g. 529 plan) in the newborn baby's name is then delivered to the client and/or daughter. In these examples, the targeted and timely delivery of information to the client and/or daughter provides an effective means of marketing the college savings plan as it is based on the actual needs of the recipient and is delivered at the precise moment when the recipient may have otherwise sought out the information.

In another illustrative example, a client creates a message to his granddaughter reading, "Congratulations, you finally made it! Love, Grandpa," that is set to be delivered upon her first visit to Disney World. The granddaughter installs an application on her iPhone and allows the application access to her location services. The application tracks her location and, when it detects that she visits Disney World, delivers the client's stored message for her. The system also stores her visit in a location database that is used to tailor marketing materials based on her interest in Disney characters and products. The system may have additional information about the recipient that could further refine the predicted interests of the recipient. Continuing with this example, the user also created a message to be delivered on his granddaughter's 16th birthday. The system stores the granddaughter's birthday in an informational database. When the granddaughter visits Disney World, the system determines that she is 25-years old at the time of her visit based on her stored birthday and delivers promotional coupons for local restaurants.

FIG. 1 illustrates an embodiment of the presently disclosed system for effectively distributing information upon the occurrence of an event. System 100 includes Client Computer 102 operated by a customer that would like to distribute information to one or more recipients upon a predefined event, and Information Vault Server 103 for storing and managing the distribution of the information received by the customer. Information Vault Server 103 includes a User Interface/Website 103A for providing a graphical user interface to the customer, Information Database 103B for storing the information to be distributed as well as data pertaining to the events that will trigger the distribution of that data. Client Computer 102 is able to access User Interface/Website 103A via Internet 101. As an example, the user may access User Interface/Website 103A, upload a video message, input the intended recipient(s) for the message, and input the event(s) that will trigger the distribution of the uploaded message to the intended recipients, for example, upon the user's death or the recipient's sixteenth birthday. In one embodiment, the Information Vault Server 103 may communicate with Social Media Server 104, which hosts a social media website, in order to receive certain information related to the user and/or the recipient. For example, the Social Media Server 104 may provide information relating to the user's death, or the recipient's birthday. When the predefined event has occurred, for example, the recipient's sixteenth birthday, the Information Vault Server 103 distributes the information received from the user to the recipient. This distribution may be made from the Information Vault Server 103 to the Recipient Computer 105 (through an application), to the recipients e-mail address, or to the recipient's social media account on Social Media Website 104A. The Client Computer 102 and/or Recipient Computer 105 may be any type of computing device, described in further detail below, such as a mobile device.

In one embodiment, an application is provided so that the user may record video/audio and input information, and transmit the video/audio/information to the Information Vault Server 103 directly from the user's mobile (or non-mobile) device. Additionally, the application may provide categorization options for the information transmitted to the Information Vault Server 103. For example, if the user chooses to record a video or upload a video from the application, the application presents a notification asking the user to define the type of video, and allowing the user to select, for example: legal, personal, travel, family, custom, etc.

In another embodiment, the application provides a collection of premade digital content, such as professional stock photos/videos, articles, web content, clip art, animations, music and movie clips, from which the user may select to include for distribution to designees. Within this embodiment, the premade content library made available to the user dynamically adapts to the assessed needs of the user. In one embodiment, the content library reflects the designated life events of the client and/or designee. For example, a client begins creating a message to be delivered to his granddaughter on her fifth birthday. The application detects the designate life event as "grandchild's birthday" and provides a library of images of popular cartoon characters.

In another embodiment, the application provides the user with content templates that would provide a framework for creating content and/or content suggestions that would give the user ideas for the types of content that could be included in his or her message to the designee. The templates or suggestions provided to the user dynamically adapts to the assessed needs of the user. In one embodiment, the content templates or suggestions provided to the user are dependent on the designated life events of the client and/or designee. For example, a client begins creating a message to be sent to her son upon his marriage. The application detects the designated life event as "marriage" or "wedding" and suggests including photos from the grandparent's own wedding. In another embodiment, the assessed needs of the user are determined from the user's location, which could be calculated from the user's mobile device location services (e.g. GPS), or by the user's manual input into the application or "check-in" on social networking websites (e.g. Foursquare, Facebook). For example, the application determines that the user is located at a theme park and provides a notification suggesting that the user take photos with certain theme park mascots to be included in a message to a child designee.

The application, in one embodiment, may include features to allow the user to review products related to life insurance, estate planning, retirement accounts, etc. Thus, the information storage application will be conveniently and seamlessly tied to such future planning tools. As an example, a user may create a video message for a newly born child that he wishes to be delivered to his child when she is 16 years old. The user can access the application on his mobile device, and record and transmit the video to the Information Vault Server 103. Upon accessing the application, the user is presented with the option to update or purchase life insurance or estate planning, and is able to conveniently update his life insurance policy to name his new child as a beneficiary.

Figure 2:
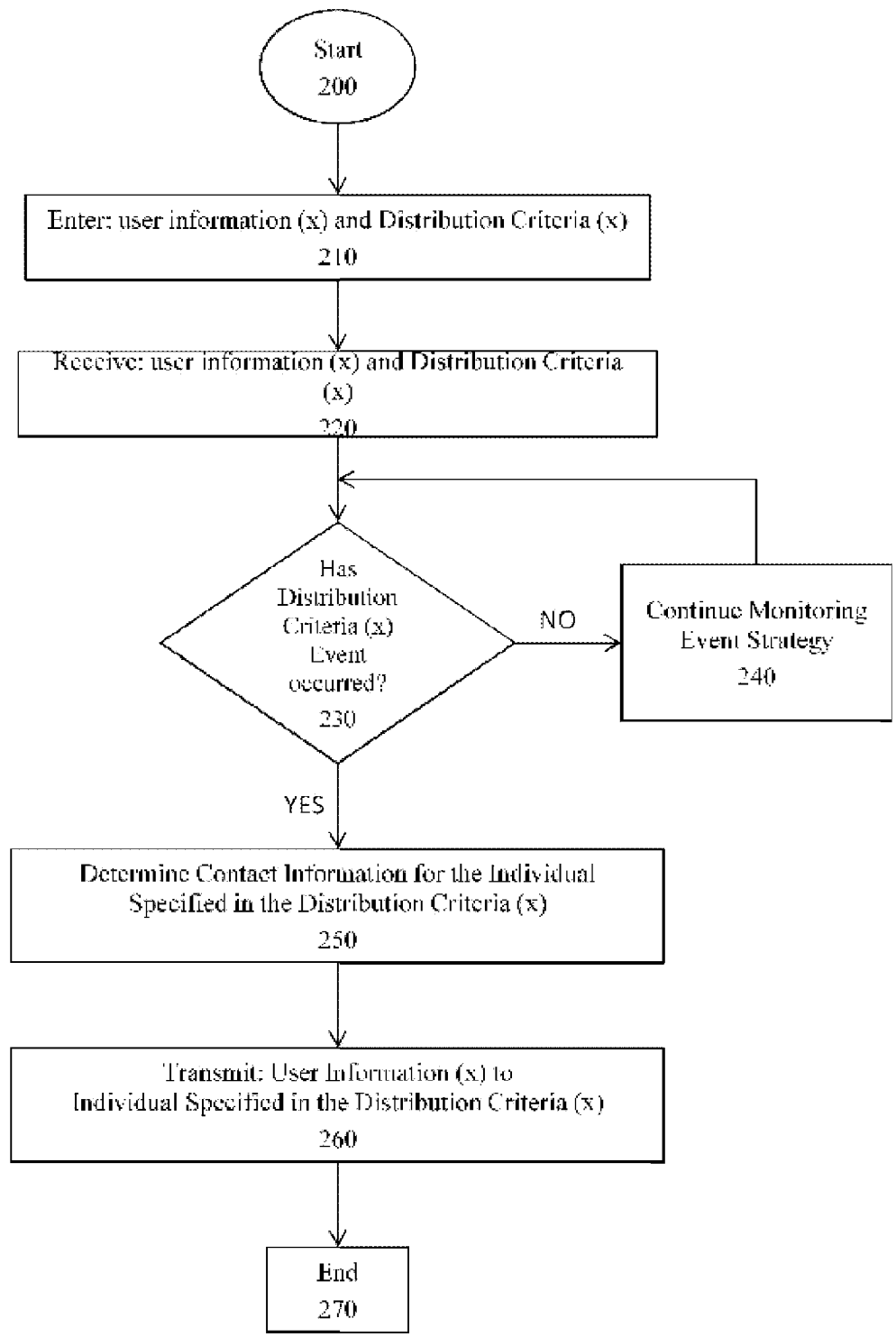
FIG. 2 illustrates the process flow of the disclosed technology in accordance with one embodiment.

FIG. 2 is a flow chart of the process flow of the disclosed technology in accordance with one embodiment. The process starts at 200 and proceeds to 210, where the user enters User Information and Distribution Criteria. For example, the user may enter this information at a computer, such as a desktop computer or a mobile device. The User Information is the information that the user wishes to have distributed at a later time; for example, a video message, letter, audio message, bank account information, email account information, will, etc. The Distribution Criteria includes names and/or contact information for the individual(s) the user wants the User Information to be distributed to (i.e. "designees"). The Distribution Criteria also includes information about the event that will trigger the distribution of the User Information; for example, a birthday, death, anniversary, etc. At step 220, the User Information and Distribution Criteria are received by a third party server, such as the Information Vault Server 103. It is understood by those skilled in the art that the server can be a distributed computer system, for example, a cloud computing system.

The Information Vault Server 103, or another mechanism, monitors event statuses and determines whether the event specified in the Distribution Criteria has occurred, steps 230 and 240. For example, the Information Vault Server 103 may monitor a social networking site, or another database, to determine whether an individual has died (if the individual's death was specified as the triggering event). In one embodiment, the event status is updated manually. For example, an individual's spouse submits a report to the system that the individual has died and the event status is updated. Additional event verification steps may occur at this part of the process. As described above, the client may designate one or more proxies that serve to confirm the occurrence of an event. Once the Information Vault Server 103 has determined that the event specified in the Distribution Criteria has occurred, the Information Vault Server 103 determines the contact information for the individual specified in the Distribution Criteria, step 250. The contact information may have been received from the user, or the Information Vault Server 103 may query another database, such as a social network database, for this information. At step 260, the Information Vault Server 103 transmits the User Information to the individual specified in the Distribution Criteria. For example, the Information Vault Server 103 may email a video message to the user's daughter, after the user's death. The process ends at step 270.

Figure 3A:
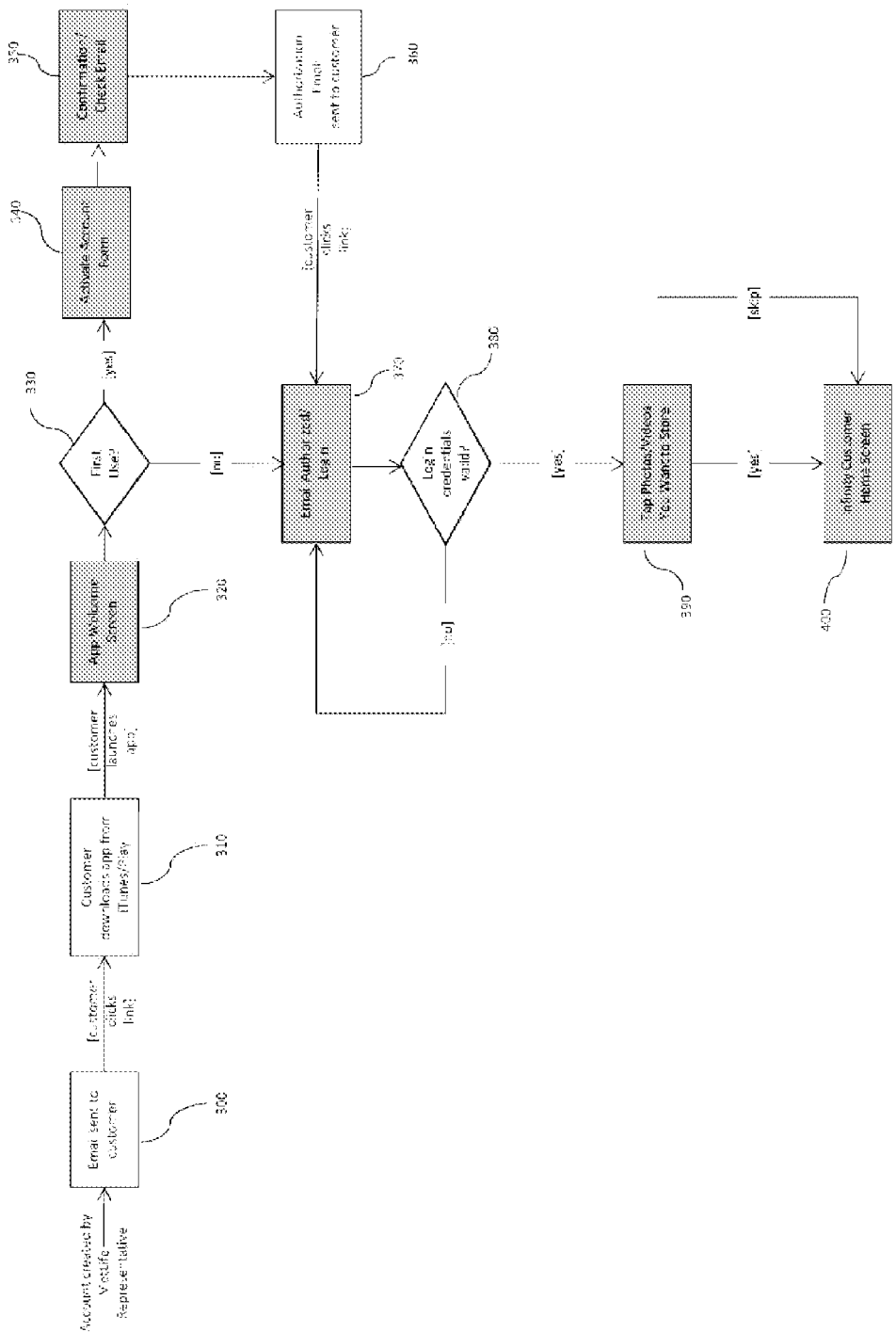
FIGS. 3A and 3B provide logic diagrams for initial client account set up.
Figure 3B:
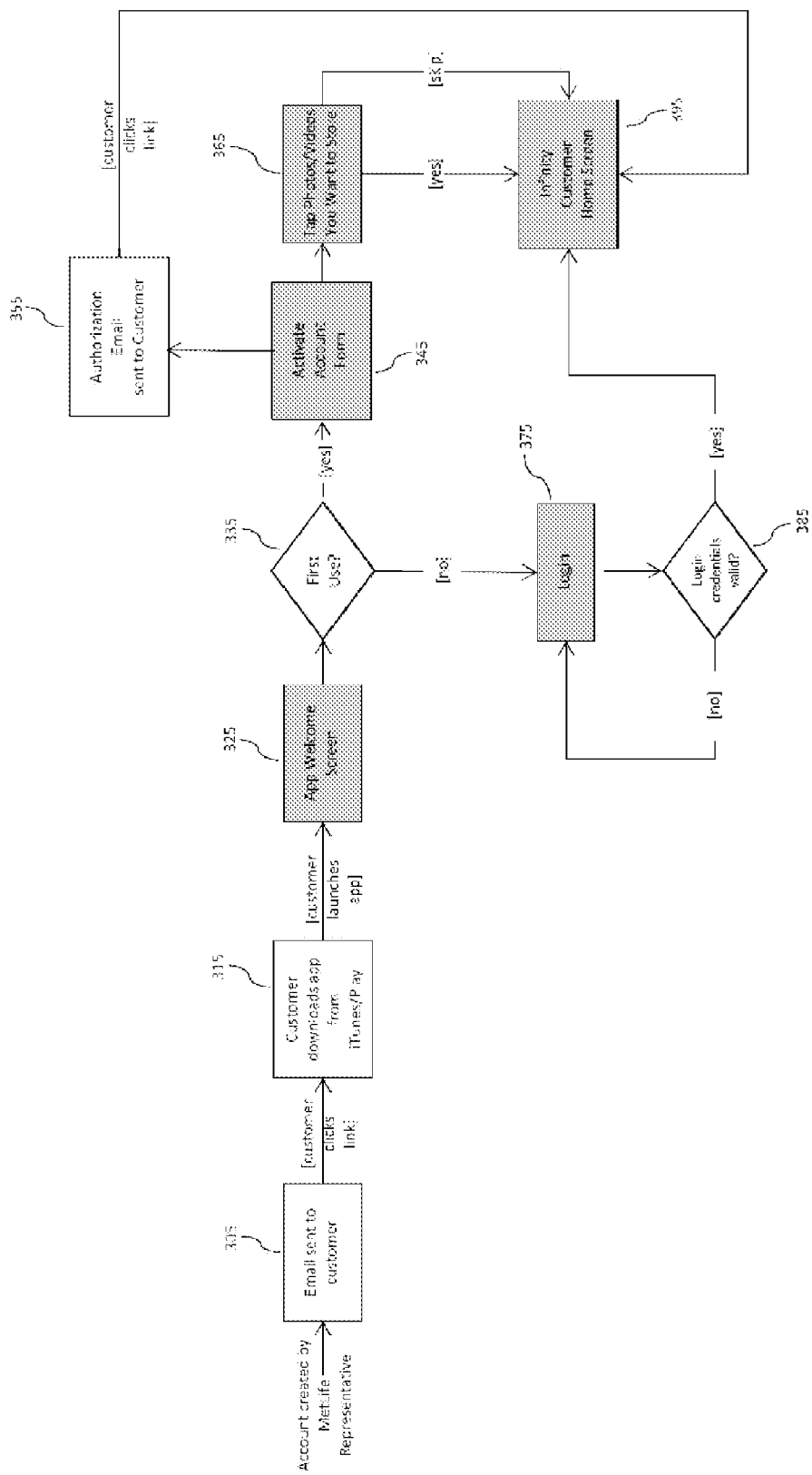

Turning now to FIGS. 3A and 3B, the processing logic for the initial client account set-up is depicted in logical block format. In FIG. 3A, once the account has been opened by the Account Representative, an email is sent to the client, block 300, linking the client to a mobile "app store" (e.g. Apple iTunes, Android Play Store, Blackberry World, Windows Phone Store) or similar mobile software application distribution portal from which a dedicated mobile software application is downloaded and installed to the client's mobile device (e.g. smartphone, tablet computer), block 310. Alternatively, the software application may be designed for installation on the client's laptop or desktop computer (e.g. Mac, Windows/PC). Launching the installed application allows access to the welcome screen, block 320.

Continuing with Test 330, the system detects new users and directs them to an account activation form, block 340, where the new user enters his or her credentials, including email address. The system confirms the credentials and instructs the user to check his or her email, block 350. An authorization email is sent to the client, block 360, that contains a link directing the client to a page that confirms the client's email address and prompts for login credentials, block 370. Existing users are also directed to a login prompt, block 370. The login credential test, test 380, directs users with a valid login response to block 390 for interactive upload of photos/videos, and return to the home screen upon completion, block 400.

An alternative arrangement is provided in FIG. 3B. Here, the logic from block 305 to test 335 is similar to the logic as described above in FIG. 3A from block 300 to test 330. Here, at new user test 335, new users are sent to an account activation form, block 345, to enter his or her credentials, including email address. The system confirms the credentials and directs the new user to block 365 for interactive upload of photos/videos. The system also sends an authorization email to the email address provided by the client, block 355, that contains a link directing the client to the client welcome screen, block 395. For established users, logic shifts to block 375 for login and credential check at block 385. In either path, the user enters the system home screen, block 395.

Figure 4:
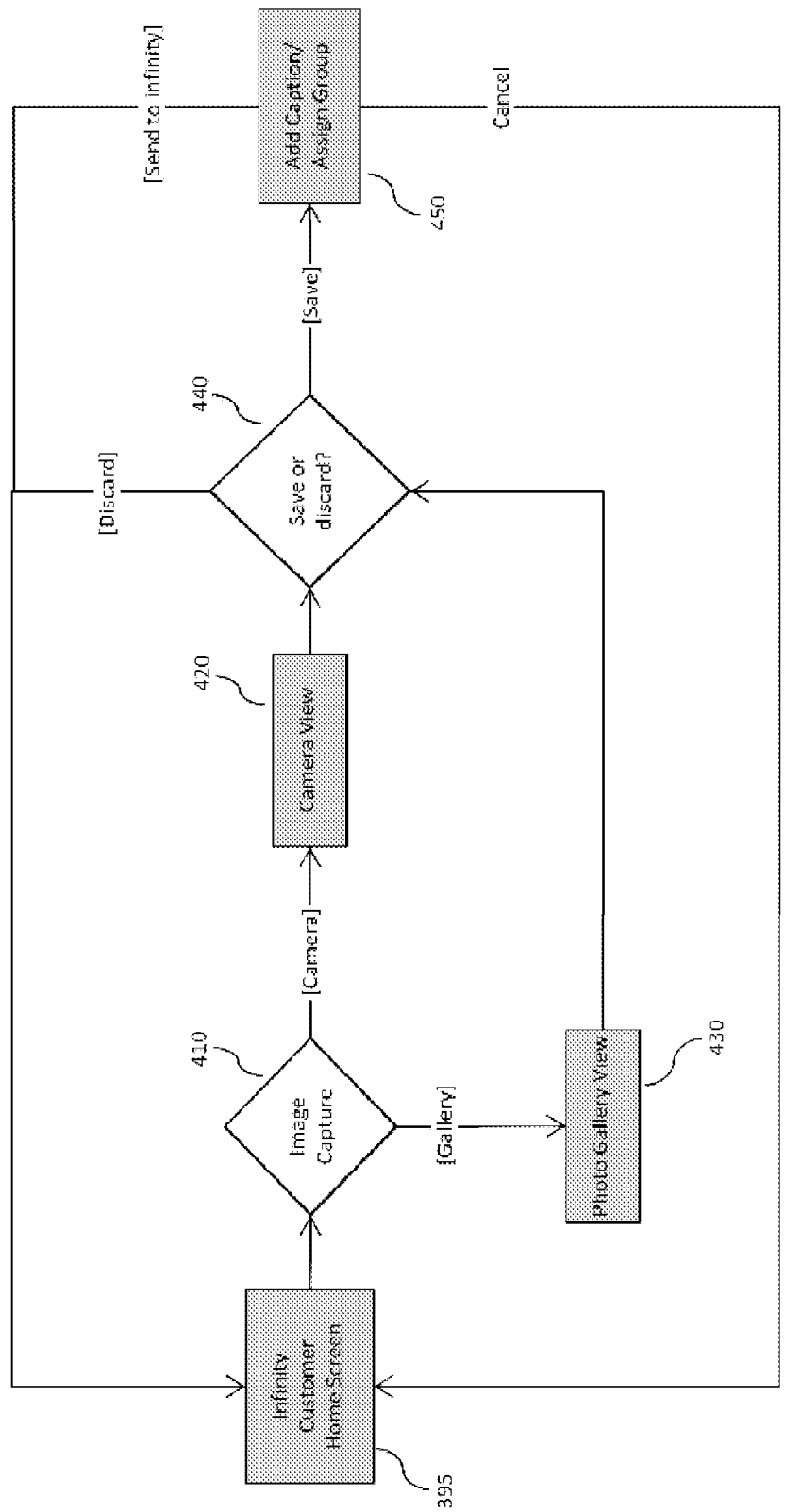
FIG. 4 provides account processing logic for image/video uploads.

Turning now to FIG. 4, image or video uploads are provided by the user, starting with home screen block 395 and continuing to test 410 for image or video selection. Here, the choice is from a stored gallery, block 430, or an image/video recorded on the device or computer's camera sensor, block 420. In either event, the query allows for saving, test 440, with the saved images/video stored with the option of adding captions and identified groups, block 450.

Figure 5:
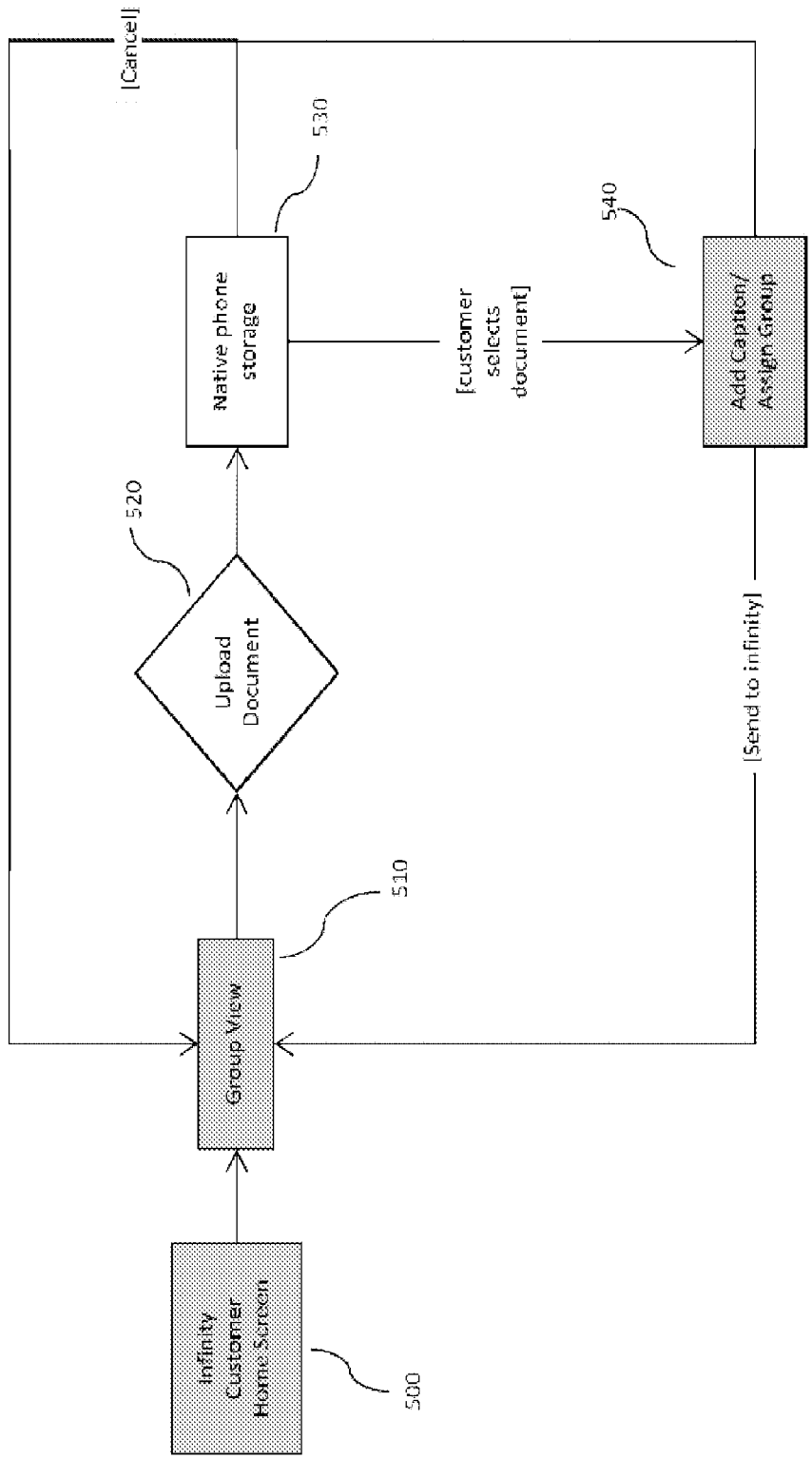
FIG. 5 provides account processing logic for document uploads.

There are several layers of functionality provided to the users. These are illustrated in part by the following flow diagrams beginning with FIG. 5 and the home screen 500 directed to document upload/storage control. To begin, the system enters the "group view" where all existing saved content is viewable, block 510, followed by test 520 for document selection/upload command. At block 530, the native phone storage is applied, with caption additions, and group assignments at block 540—logic then returns to the originating group view 510 for the next document.

Figure 6:
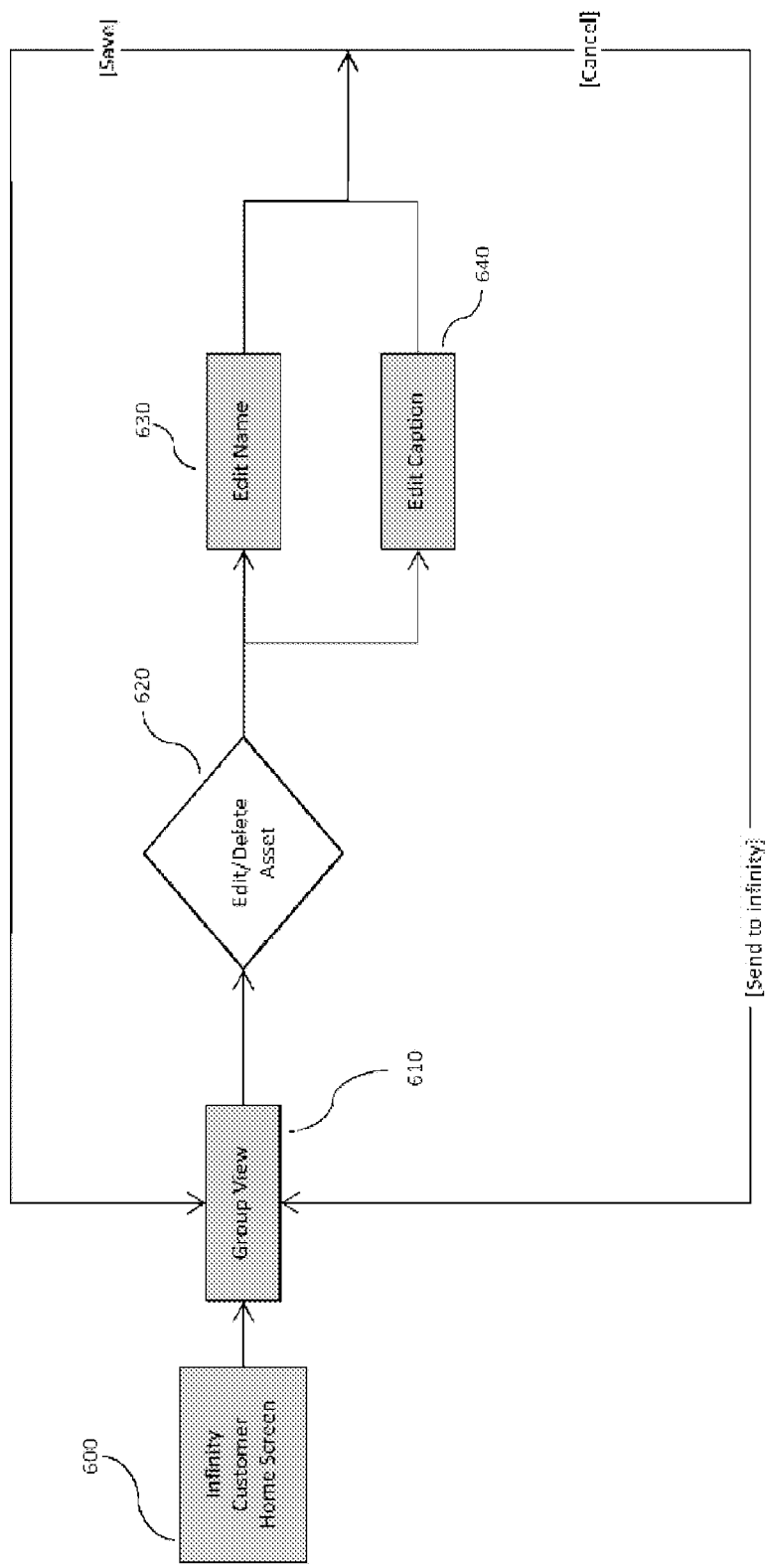
FIG. 6 provides account processing logic for asset management.

A similar logic is found with respect to FIG. 6, used for image/video/document management. Logic again starts at the home screen 600 and passes to the group view 610 before test 620. At test 620, the user selects whether to edit or delete the digital asset; if yes to edit, blocks 630 and 640 allow for caption changes, and name modifications, with logic moving back to the group view 610 upon completion.

Figure 7:
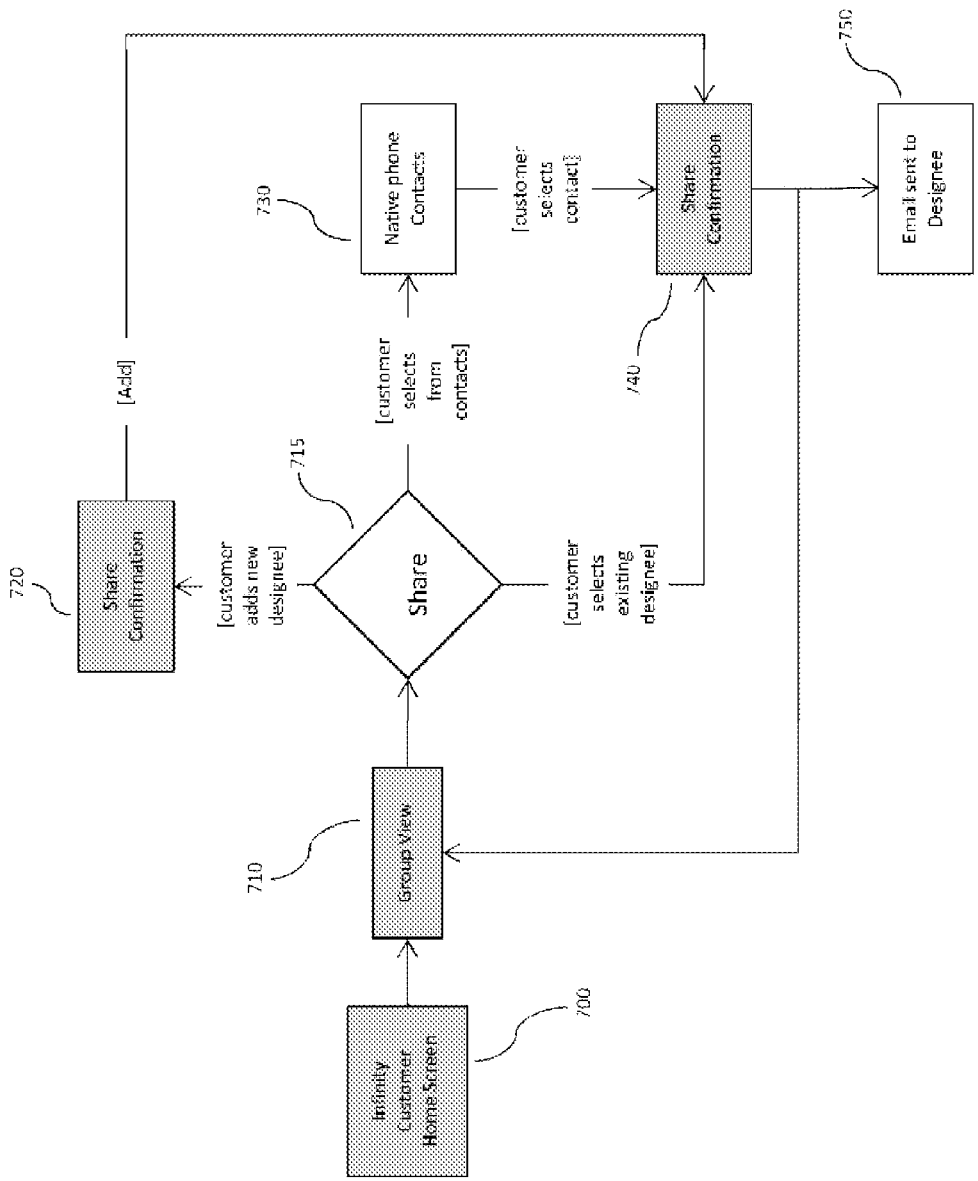
FIG. 7 provides account processing logic designee share asset functions.

Turning now to FIG. 7, the system asset sharing characteristics are implemented. Logic begins conceptually at block 700 home screen and group view at block 710. Share test 715 allows the client to select whether to share assets with an existing designee, a designee from the client's phone contacts or to enter a new designee for sharing. For a new designee, logic moves to block 720 and entry of new designee parameters. In either logic path, the selected designee is confirmed at block 740. An email is passed on to the designee selected per the above at block 750.

Figure 8:
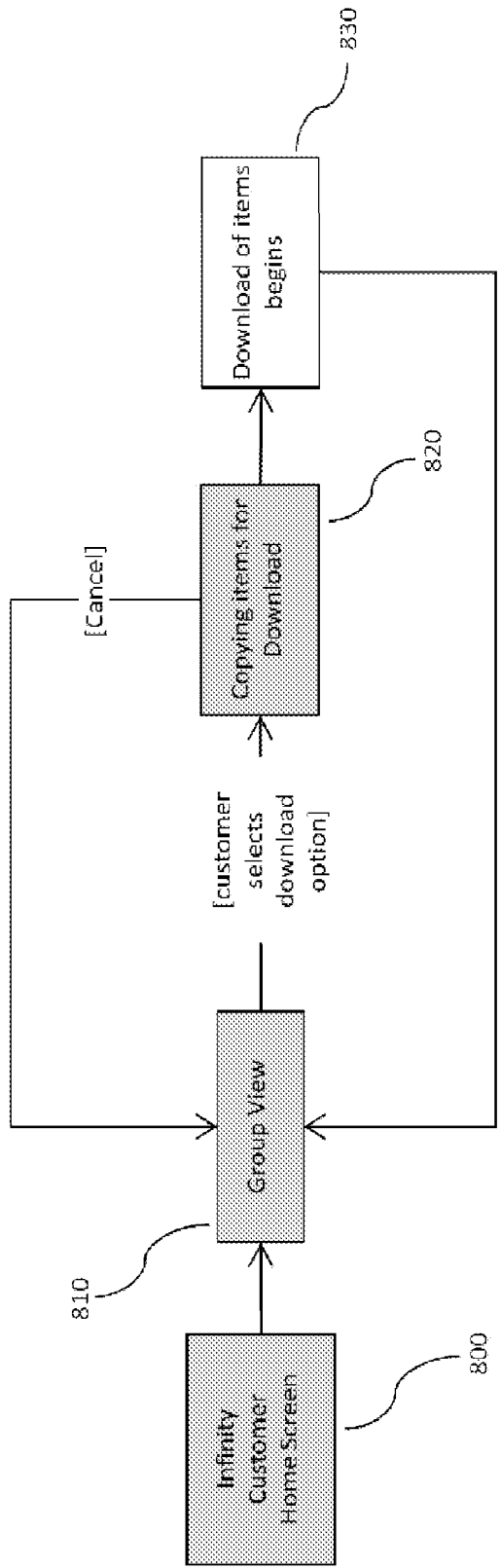
FIG. 8 provides account processing logic for export/download asset functions.

In FIG. 8, the system allows for either the client or his/her designees to download content saved to the Information Vault Server 103. Beginning at the home screen 800, the user can enter the group view 810 from which the user can select the option to download content. The user then designates the content to be downloaded, block 820, and the download process is initiated at block 830.

Figure 9:
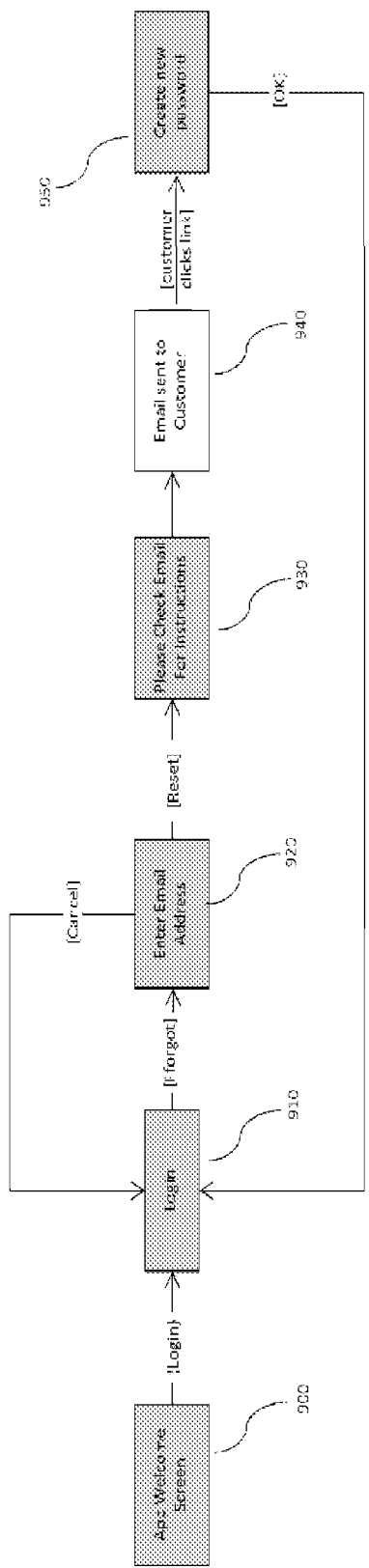
FIG. 9 provides logic for password recovery.

In FIG. 9, the password recovery process is provided. Starting with the welcome screen, block 900, the user selects the option to log in to the system. At the login prompt, block 910, the user may choose to initiate the password recovery process. The user is prompted to enter an existing client or designee email address, block 920, which triggers the system to reset the password associated with the client or designee, and prompts the user to check his or her email for further instructions, block 930. The system sends an email, block 940, to the email address entered at prompt, block 920, that contains a hyperlink. When clicked, the hyperlink directs the user to a webpage, block 950, that prompts the user to create a new password.

Figure 10:
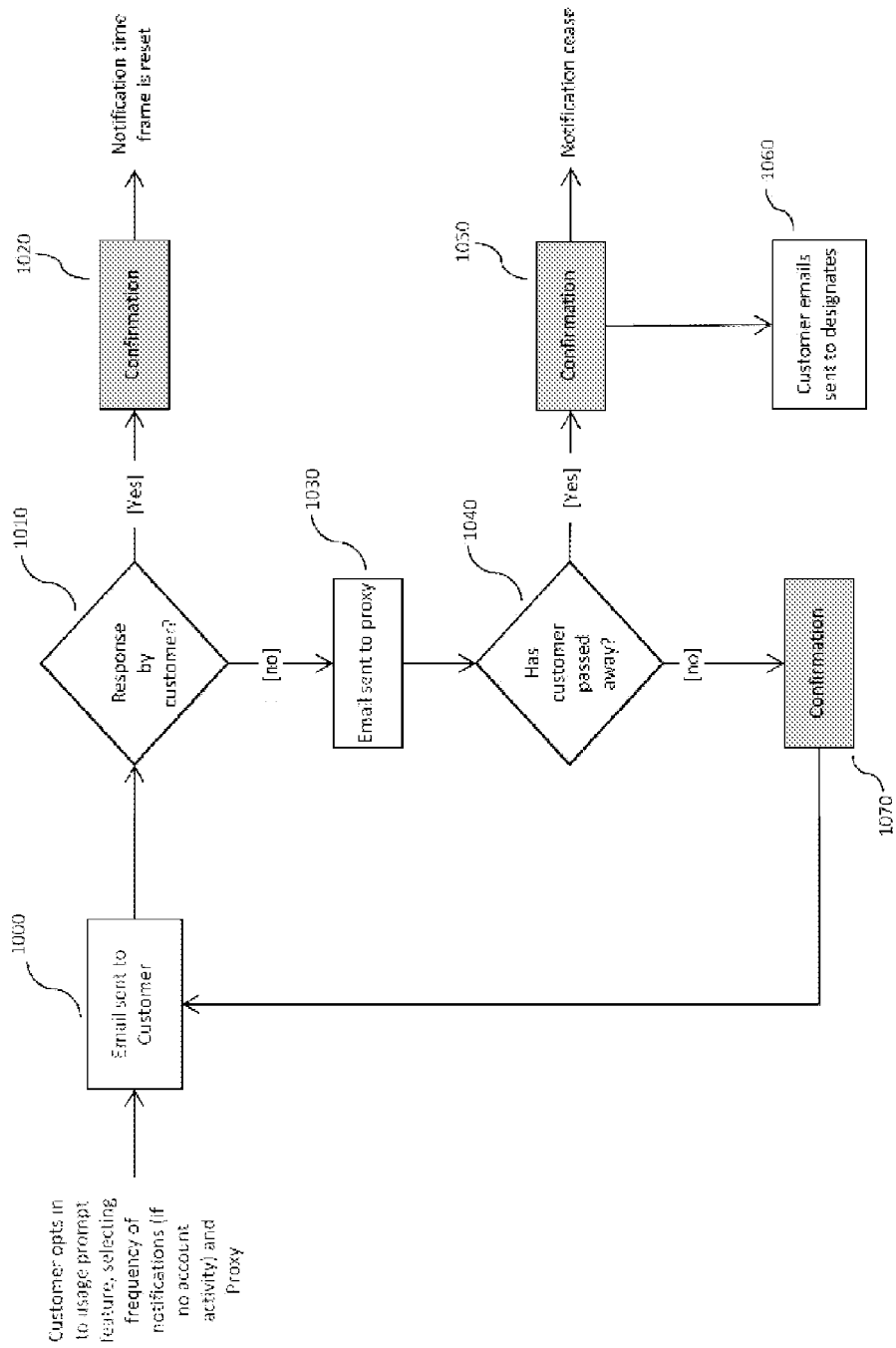
FIG. 10 provides logic for usage prompts.

FIG. 10 provides the logic for usage prompting—that is, after a select period of inactivity, the system reaches out to the client and/or designees to ascertain if a qualified event have transpired. Based on stored frequency data, the system will send an email to the client after passage of the predefined period, block 1000. If the client responds, test 1010, the response is confirmed, block 1020 and the time interval reset. If the client fails to respond to the email, test 1010, logic branches and a second email is sent to the proxy, block 1030; test 1040 checks for a proxy response and confirms whether the client has passed away. If yes, block 1050 triggers the confirmation—and ceases notifications; in addition, the confirmation triggers email notifications to the client designees per the program underlying logic, block 1060. If the proxy response indicates that the client is still alive, this is confirmed with the system block 1070, and logic returns to block 1000.

Figure 11:
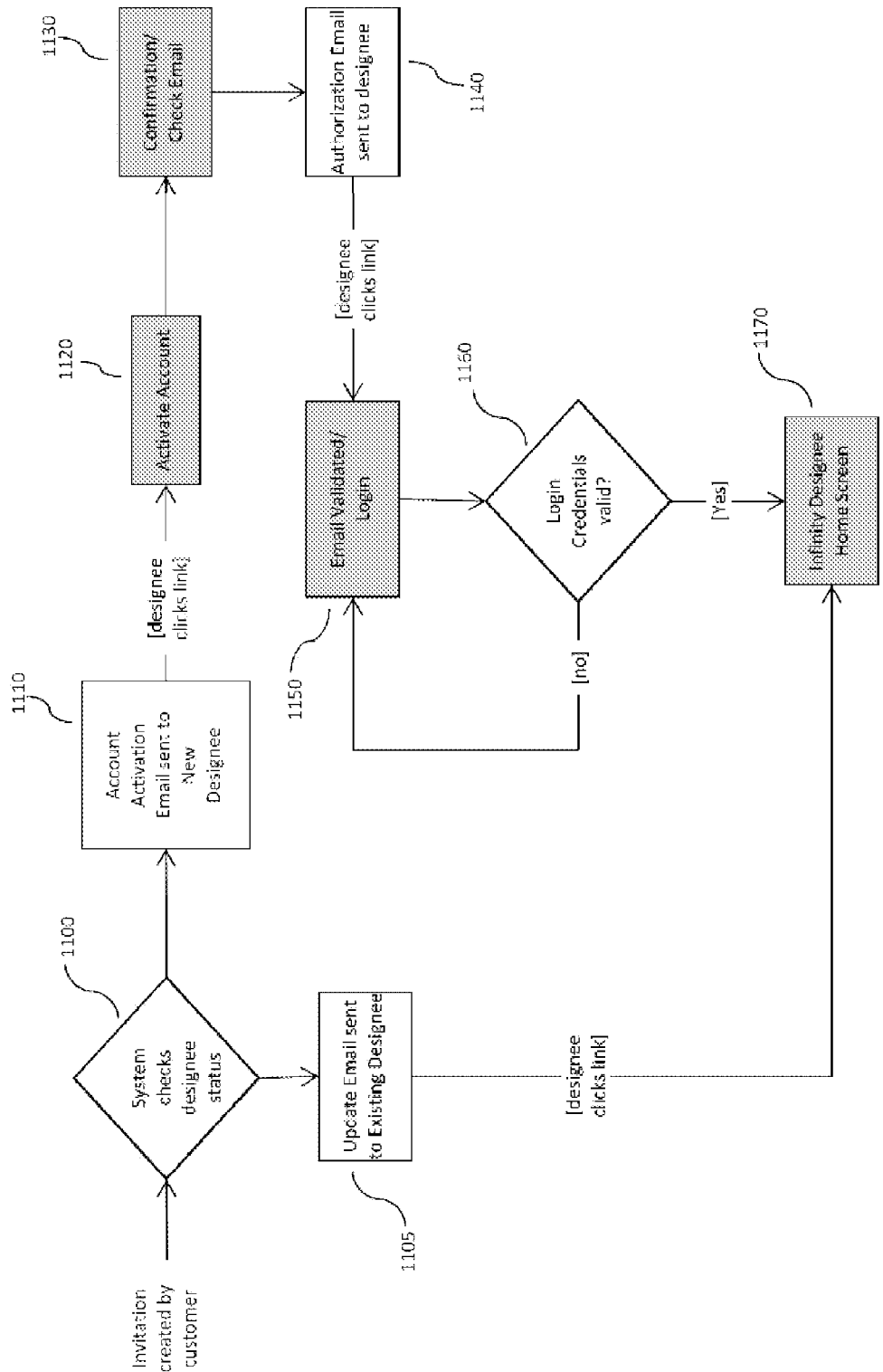
FIG. 11 provides account processing logic for designee entry.

Turning now to FIG. 11, operation permits client selection of designees pursuant to system parameters. At test 1100, the proposed designee is checked against stored designees. If the proposed designee is found in the stored designees, an update email is sent to the designee, block 1105, that contains a hyperlink directing the designee to the designee home page, block 1170. If the proposed designee is new (i.e. not found in the stored designees), the account activation process begins with a notification email sent to the proposed designee, block 1110, that contains a hyperlink directing the designee to an account activation page, block 1120. Account activation is confirmed by an email, block 1130. An authorization email is then sent, block 1140, to the designee for entry of login credentials, block 1150. These are tested, test 1160 and if passed, the designee home page is presented to the new designee.

The following example illustrates various aspects of the disclosed technology according to an embodiment. Jonathan is on an out-of-town business trip in New York and he is thinking of his wife Maria, and their 2-year-old son, Brian. On his mobile device, using the information storage application, he records a video message for his son Brian. He adds a text note, and release instructions for his "designee" Brian (e.g. Brian can have access to this video and note on his 16th birthday).

For his wife, Maria, Jonathon takes some photos of a New York restaurant where they had their first date using the application's Time Capsule feature. The Time Capsule feature keeps a timeline of the stored information and, optionally, the location in which the information was recorded. He annotates the photos (e.g. "our first date!") and immediately shares to his designee Maria. She has instant access to the images and will be notified on her mobile device via Time Capsule notifications. Maria has just found out that she is pregnant and wants to make a record of the moment, so she adds a date to her Time Capsule along with the message: "Today found out I'm pregnant!"

Following the announcement that his wife is pregnant, Jonathan wants to modify his administrative preferences in anticipation of the birth of his child. To do so, he visits (or logs on to) the Time Capsule website (which is an optionally different interface than the Information Storage interface). Jonathan sets up a new designee, his new child, and then sets other parameters, including notes about how he wants to allocate money, etc. He also ensures that Maria has access to all of his digital identities and passwords she would need upon his death. Thus, Jonathon's important information is centralized, secured, and accessible to loved ones at a time that he designates.

To aid in explanation, the included figures illustrate exemplary embodiments of the presently disclosed technology and are not restrictive.

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, smart phones such as iPhones™, tablet devices such as iPads™, multiprocessor systems, microprocessor-based systems, set top boxes, programmable consumer electronics, network PCs, minicomputers, mainframe computers, distributed computing environments that include any of the above systems or devices, and the like.

Components of the inventive computer system may include, but are not limited to, a processing unit, a system memory, and a system bus that couples various system components including the system memory to the processing unit.

The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

The invention claimed is:

1. A computer-implemented method, comprising:
    receiving, by a processor at a server, from a user computer of a user, via a distributed network, user information, disclosure data for distribution, user-selected distribution criteria that is used for a future-oriented method of planned communication, wherein said distribution criteria comprises contact information of a recipient for receiving the disclosure data, a predefined event for triggering the distribution of the disclosure data to the recipient, and contact information of a proxy for confirming occurrence of the predefined event before triggering the distribution of the disclosure data to the recipient;
    sending an instruction to a non-transitory storage medium at the server to store the user information, the disclosure data, and the user-selected distribution criteria;
    receiving an instruction indicating occurrence of the predefined event;
    sending an instruction to the proxy based on the contact information of the proxy to seek confirmation of the occurrence of the predefined event;
    receiving the confirmation from the proxy confirming the occurrence of the predefined event;
    accessing the non-transitory storage medium for the stored contact information of the recipient; and
    transmitting, via said distributed network, the disclosure data to said recipient based on said accessed contact information after receiving the confirmation from the proxy,
    wherein the distribution criteria includes a plurality of proxies and a confidence threshold indicating a predefined ratio of proxy confirmations, wherein the processor sends an instruction to the plurality of proxies seeking confirmation of the occurrence of the predefined event, calculates a ratio of proxy confirmations based on responses received from the proxies, compares the calculated ratio to the confidence threshold, and transmits the disclosure data to the recipient when the calculated ratio meets the confidence threshold.

2. The method of claim 1 wherein said processor communicates with the recipient through an executable application installed on the recipient's mobile communication device.

3. The method of claim 1, wherein the predefined event includes a predefined location of the recipient for triggering the distribution of the disclosure data.

4. The method of claim 3, wherein the processor determines the recipient's location based on geolocation data received from the recipient's mobile communication device.

5. The method of claim 3, wherein the processor determines the recipient's location based on data received from a social networking server.

6. The method of claim 3 wherein the predefined event associated with the predefined location of the recipient occurs when the recipient enters one or more geographic areas selected by the user.

7. The method of claim 6 wherein the predefined event further occurs when the recipient is within a predefined proximity from the one or more geographic areas selected by the user.

8. The method of claim 3 wherein the predefined event associated with the predefined location of the recipient occurs when the recipient enters or is within a predefined proximity from one or more landmarks selected by the user.

9. The method of claim 1, wherein the distributed network is a wireless communication network.

10. The method of claim 1, further comprising sending an instruction to the user seeking confirmation of the occurrence of the predefined event, wherein the processor sends an instruction to the proxy seeking confirmation of the occurrence of the predefined event if the processor receives no response from the user after a predetermined period of time.

11. A computer system for processing event driven data, comprising:
    a client computer of a client for providing disclosure data for distribution to a recipient based on occurrence of a predefined event; and
    a server in communication with the client computer via a distributed network, the server including:

a non-transitory storage medium; and a processor in communication with the non-transitory storage medium, the processor configured to:

receive, from the client computer, the disclosure data for distribution, contact information related to the recipient for receiving the disclosure data, a predefined event for triggering the distribution of the disclosure data to the recipient, and contact information of a proxy for confirming occurrence of the predefined event before triggering the distribution of the disclosure data to the recipient;

send an instruction to the non-transitory storage medium to store the disclosure data, the contact information related to the recipient, the predefined event for triggering the distribution of the disclosure data, and the contact information of the proxy;

receive an instruction indicating occurrence of the predefined event;

send an instruction to the proxy based on the contact information of the proxy to seek confirmation of the occurrence of the predefined event;

receive the confirmation from the proxy confirming the occurrence of the predefined event;

access the non-transitory storage medium for the stored contact information of the recipient; and send the disclosure data to the recipient after receiving the confirmation from the proxy confirming the occurrence of the predefined event, wherein the processor receives from the client computer a plurality of proxies and a confidence threshold indicating a predefined ratio of proxy confirmations, wherein the processor sends the instruction to the plurality of proxies seeking confirmation of the occurrence of the predefined event, calculates a ratio of proxy confirmations based on responses received from the proxies, compares the calculated ratio to the confidence threshold, and transmits the disclosure data to the recipient when the calculated ratio meets the confidence threshold.

12. The system of claim 11, wherein the predefined event includes a predefined location of the recipient for triggering the distribution of the disclosure data.

13. The system of claim 12 wherein the processor acquires geolocation data on the recipient.

14. The system of claim 13 wherein the processor acquires the geolocation data from the recipient's mobile communication device, and the mobile communication device includes an executable application program capable of account data communication to the processor.

15. The system of claim 14 wherein the application program acquires location data from the mobile communication device and transmits the location data to the processor through the distributed network.

16. The system of claim 11 wherein the processor acquires the geolocation data on the recipient from social media websites.

17. The system of claim 11, wherein the processor is configured to send an instruction to the client seeking confirmation of the occurrence of the predefined event, wherein the processor sends the instruction to the proxy seeking confirmation of the occurrence of the predefined event when the processor receives no response from the client after a predetermined period of time.

* * * * *